Feb. 16, 1965  A. F. OATLEY  3,169,470
MULTIPLE SKEWER ATTACHMENT FOR A BROILER
Filed Dec. 13, 1960  2 Sheets-Sheet 1
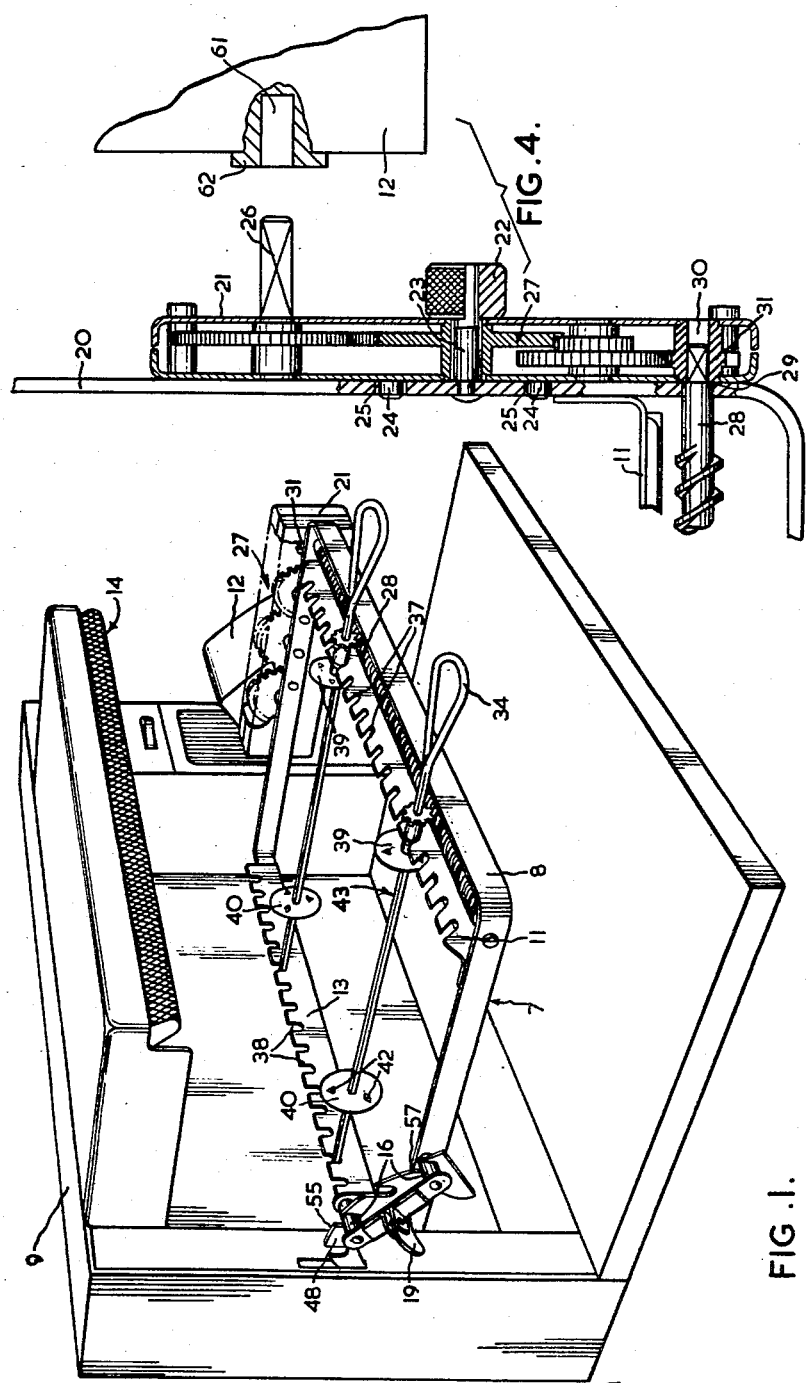

Feb. 16, 1965  A. F. OATLEY  3,169,470
MULTIPLE SKEWER ATTACHMENT FOR A BROILER
Filed Dec. 13, 1960  2 Sheets-Sheet 2
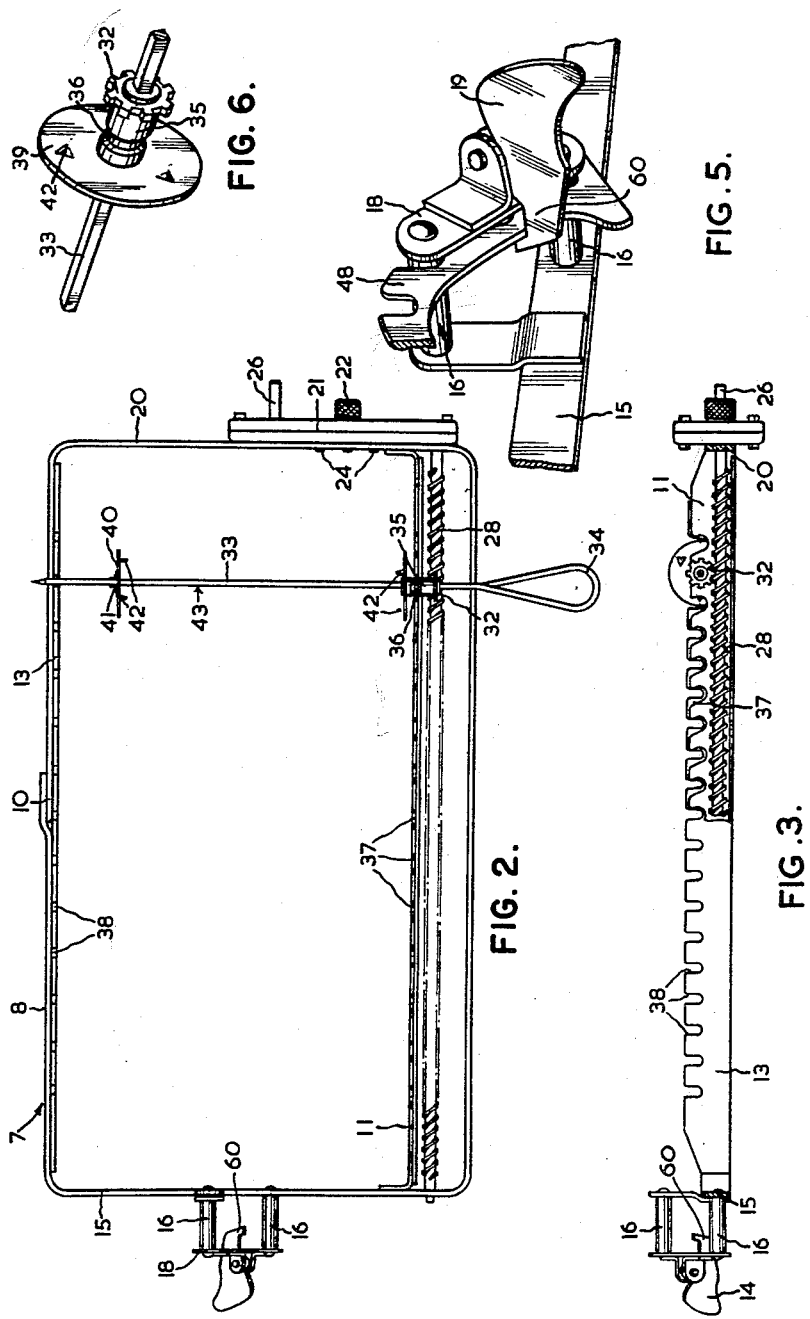

United States Patent Office 3,169,470
Patented Feb. 16, 1965

3,169,470
MULTIPLE SKEWER ATTACHMENT
FOR A BROILER
Arthur Frederick Oatley, Wilton Lodge, Wergs Road,
Tettenhall, Wolverhampton, England
Filed Dec. 13, 1960, Ser. No. 75,604
3 Claims. (Cl. 99—421)

This invention relates to grilling appliances which are parts of cookers or independent units.

The present invention consists in a grilling appliance comprising power-operated driving means, a frame or support detachable from the basic grilling appliance and separable from the driving means, a plurality of skewers, detachably mounted horizontally in the frame or support in spaced driving positions, and coupling means for connecting one of the skewers to the driving means for rotation in any of the driving positions, the drive to an individual skewer being disconnected at the coupling means by removal of the skewer from its driving position.

Further according to the invention in or for a grilling appliance having power-operated driving means a multiple skewer unit comprising a frame or support detachable from the grilling appliance, a plurality of skewers detachably mounted horizontally in the frame or support in spaced driving positions, and adapted to be driven by the driving means, coupling means for connecting one of the skewers to the driving means for rotation in any of the driving positions, the drive to an individual skewer being disconnected at the coupling means by removal of the skewer from its driving position and the drive to the coupling means being readily separable from the driving means for removal of the unit.

Each skewer can be used for cooking an individual portion of food, a "kebab" for example.

Preferably an appreciable number of driving positions is provided so that alternative arrangements of the skewers can be made according to the number and size of the portions to be cooked.

The coupling means may be a single form of gear drive such as a worm and pinion, each skewer having a pinion which is brought into mesh with the worm when the skewer is placed in the driving position. Alternatively the coupling means may be an elementary form of dog clutch, for example, a socketted member to receive the squared end of a skewer, or some other form of aligned coupling, for example an arm rotated in a circular path by the driving means and engaging a radial projection on the skewer.

The frame or support may carry drive transmission means which connects the drive to the coupling means and is arranged to be disconnected from the driving means for detaching the frame or support.

The frame or support is preferably arranged to support the skewers below a radiant heating surface which is horizontal at least in the position of use.

The invention will now be described with reference to an embodiment illustrated, by way of example, in the accompanying drawings in which, FIGURE 1 is a front perspective view of a grilling appliance provided according to the present invention with a multiple skewer unit.

FIGURE 2 is a plan view of the multiple skewer unit.

FIGURE 3 is a front elevation of the unit partly broken away to reveal the rear of the unit.

FIGURE 4 is an enlarged fragmentary plan view partly in section of part of FIGURE 2 and showing fragmentarily and partly in section a spit-driving motor included in the grilling appliance.

FIGURES 5 and 6 are perspective views of details.

In this example, the multiple skewer unit indicated at 7 is arranged for use with a grilling appliance 9 of the kind described in our United States patent application No. 833,834 which has a spit driving motor 12 and is arranged to spit roast or grill food below a radiant surface 14, which at least when in use is horizontal. The unit 7 is detachably supported by the spit-driving motor 12 at one end in a manner which will be described later, and the arcuate spit-supporting member 48 at the other, as shown in FIGURE 1.

The unit 7 has an open rectangular frame 8 supported horizontally below the radiant surface 14 and formed from a single metal strip bent into shape, the overlapping ends 10 being welded or riveted together at the rear of the frame, as shown in FIGURE 2. Inside the frame parallel to and spaced a little away from the front a cross-member 11 is mounted, and a cross-member 13 is also secured to the rear of the frame. At the side 15 of the frame 8 opposite the spit driving motor 12 are two spaced laterally projecting arms 16 disposed, as shown in FIGURES 1 and 5, so as to engage two open-ended upright slots 55 and 57 provided in the arcuate spit-supporting member 48. Connecting the outer ends of the arms 16 is a bridge piece 18 which carries a pivoted gravity catch 19. When the unit is mounted in position for use a hook-shaped portion 60 of the gravity catch 19 engages the under edge of the arcuate spit-supporting member 48, as shown in FIGURE 5, and by virtue of its shape and the position of its pivotal axis, prevents accidental displacement of the arms from the open-mouthed slots. The frame or support is kept horizontal by the engagement of the arms 16 and open-mouthed slots.

Detachably mounted on the other side 20 of the frame is a gear box 21. The gear box 21, as shown more clearly in FIGURE 4, is attached to the frame by tightening a knurled finger nut 22 onto a screw threaded stud 23 secured to the side 20 of the frame and passing through the gear box.

A pair of locating studs 24 on the side of the gear box engages holes 25 in the side 20 of the frame and locate the gear box against movement on the frame. The arrangement is such that the gear box can be easily detached from the frame for cleaning purposes. Journalled in the gear box 21 is a square ended stub-shaft 26 which projects laterally through the side of the gear box and, when the gear box is mounted on the frame, can engage the square socket 61, FIGURE 4, of a drive coupling 62 of the spit-driving motor 12. The stub-shaft 26 has a good bearing in the gearbox and when the unit is in position on the grilling appliance it is the only support for the side 20 of the frame; this ensures that the stub-shaft is always in correct alignment with the socket. Inside the gear box the stub-shaft is connected by a gear train 27 to a cross-shaft 28 parallel to and in front of the cross-member 11 and journalled in openings 29 in the side portions of the frame. The cross-shaft 28 extends through the opening in the side portion of the frame adjacent the gear box and the end portion of the shaft is square shaped to engage a square socket 30 in a pinion 31 which forms part of the gear train 27. The gear train 27 and cross-shaft 28 constitute drive transmission means.

Each of the cross-members 11 and 13 has a row of equally spaced upwardly open-ended slots or recesses 37, 38. Each slot or recess 37 is opposite one of the slots or recesses 38. The opposed pairs of slots of recesses afford front and back supports in the cross-members for skewers 43 and define equally spaced driving positions in which the skewers can be detachably mounted across the frame, as shown in FIGURES 1 and 2, at right angles to and slightly above the cross-shaft, FIGURE 3. Each skewer is rotated by the cross-shaft through coupling means formed by a simplified worm and pinion drive. The worm is continuous and extends along the cross-shaft 28 past all the driving positions. A large number of driving positions are provided allowing a wide selection of possible arrangements of spacing of the skewers. The pinions indicated by 32, as shown more clearly in FIGURE 6, are blanked and pierced and fit tightly the shanks 33 of the skewers 43 close to the handles 34. The skewers 43 are of square section. A hub 35 of each pinion has a circumferential groove 36 which engages the edges of the particular slot 37 locating the skewer axially. The axes of the slots 37 are inclined away from the vertical in the direction opposite to the direction of rotation of the skewer in order to prevent the skewer rolling upwards out of the slot owing, for example, to offset loads on the skewer.

The skewers are placed in position by dropping the pointed end into one of the slots 38 in the rear cross-member and the groove 36 of the pinion hub 35 into the corresponding slot 37. This brings the pinion 32 into mesh with the worm so that the drive for rotation of the skewer is connected. The skewer is equally easily disconnected simply by lifting it out of its bearings, even while the motor is still running.

Instead of the coupling means between the skewers and the driving means already described the coupling means could be provided by an elementary form of dog-clutch, for example, a socketed member to receive the square section pointed end of a skewer, or by some other form of aligned coupling, for example an arm rotated in a circular path by the driving means and engaging a radial projection on the skewer.

The items of food or kebab are retained against axial and rotational movement relative to the skewers by a pair of discs 39 and 40 arranged to be fitted at each end of the food. A disc 39 at the handle end of the skewer is fixed on the hub 35, as shown in FIGURE 6. The other disc 40 has a square axial hole so that it can be slid along the shank of the skewer from the pointed end to retain the items of food at that end. A spring device 41 is provided as part of the disc 40 which grips the shank of the skewer and holds the disc quite firmly in position and prevents it being moved by the food. Both discs are struck out to provide points 42 which can grip the adjacent item of food and assist in driving.

The unit described may clearly be modified to fit other grilling appliances already provided with spit driving motors, or with grill pan or shelf supports with which the frame can be adapted to engage.

I claim:

1. A grilling appliance comprising a housing, a horizontal downwardly directed radiant heating surface mounted on the housing, a power-operated driving means having a rotary drive outlet socket of non-circular cross-section and a support member having upwardly directed open-ended slots mounted on the housing below the heating surface, and a multiple skewer unit supported horizontally under the heating surface by said driving means and support member, said multiple skewer unit having an open rectangular frame which on one side of a pair of first opposite sides has a pair of arms projecting horizontally away from the said one side and being engageable in the open-ended slots in said support member, transmission means mounted on the other side of the pair of first opposite sides, which transmission means includes a horizontally disposed rotatable shaft of non-circular cross-section corresponding to the socket which makes slidable engagement with the socket for rotation with the socket and to support the frame at the driving means, a plurality of skewers each having a coupling formation and each being detachably supported by the frame in a common horizontal plane and located in the frame parallel one to another in openings disposed in opposed, aligned pairs one in each of a pair of opposite second sides of the frame, and a coupling element mounted in the frame which is drivably connected through the transmission means to the rotatable shaft and which is drivably engaged by the coupling formations on the skewers for rotating the skewers on location of the skewers in said openings.

2. A multiple skewer unit for a grilling appliance including a power-operated spit-driving means, said skewer unit having an open rectangular frame, a plurality of skewers each having a handle at one end and supported detachably by the frame in a variety of driving positions, and coupling means mounted on the frame and drivably connectable with the spit-driving means for rotating the skewers at the driving positions, the driving positions being defined by openings in each of a pair of opposite sides of the frame which openings are at closely spaced intervals along the length of the side and are disposed in opposed aligned pairs, each pair of aligned openings defining a driving position, the driving positions so defined being parallel one with another and adjacent driving positions being closer together than the distance between two of the skewers in side-by-side contact, and the number of driving positions being in excess of the number of skewers and of the greatest number of such skewers which could be employed at any one time in the unit thereby enabling a wide selection of possible arrangements of spacing apart of the skewers to suit varying sizes of portions of food impaled on the skewers for cooking, the openings for at least the handle end of the skewers being upwardly open-ended slots inclined to the vertical.

3. A multiple skewer unit according to claim 2 wherein each skewer has a pinion having a circumferential groove which engages the edges of the open-ended slot thereby locating the pinion axially.

References Cited by the Examiner

UNITED STATES PATENTS

| 902,724 | 11/08 | Giovanna | 99—421 |
|---|---|---|---|
| 1,135,437 | 4/15 | Clegg | 211—68 |
| 1,442,584 | 1/23 | Schey | 99—421 |
| 1,642,604 | 9/27 | Cox | 99—421 |
| 2,130,259 | 9/38 | Bonaguidi | 99—421 |
| 2,330,132 | 9/43 | Martin | 99—421 |
| 2,391,571 | 12/45 | Hennessy | 99—421 |
| 2,485,890 | 10/49 | Keljik | 99—421 |
| 2,494,448 | 1/50 | Nassif | 99—421 |
| 2,854,918 | 10/58 | Merritt | 99—421 X |
| 2,929,311 | 3/60 | Heltzel | 99—421 |
| 2,939,384 | 6/60 | Vinson | 99—421 |

FOREIGN PATENTS 688,262   3/53   Great Britain.

ROBERT E. PULFREY, *Primary Examiner.*
LAWRENCE CHARLES, J. D. BEIN, L. W. VARNER, JEROME SCHNALL, *Examiners.*